Dec. 1, 1925.

B. P. BATES

PUMP

Filed Oct. 24, 1924

Inventor
Bertram P. Bates
by Casper L. Redfield Atty

Dec. 1, 1925.
B. P. BATES
PUMP
Filed Oct. 24, 1924
1,563,319
2 Sheets-Sheet 2

Inventor
Bertram P. Bates
by Casper L. Redfield Atty.

Patented Dec. 1, 1925.

1,563,319

UNITED STATES PATENT OFFICE.

BERTRAM P. BATES, OF CHICAGO, ILLINOIS.

PUMP.

Application filed October 24, 1924. Serial No. 745,552.

*To all whom it may concern:*

Be it known that I, BERTRAM P. BATES, a citizen of the United States of America, and a resident of Chicago, in the county of Cook and State of Illinois, have invented certain new and useful Improvements in Pumps, of which the following is a specification.

My invention relates to pumps, and has for its object improvements in such devices. More particularly, the present invention is for making the pump self-priming by having carried by the piston thereof a certain quantity of liquid which will be discharged automatically for priming purposes when the pump is started. A second object is to make improvements in the stuffing box for the piston rod.

In the accompanying drawings—

Figure 1:
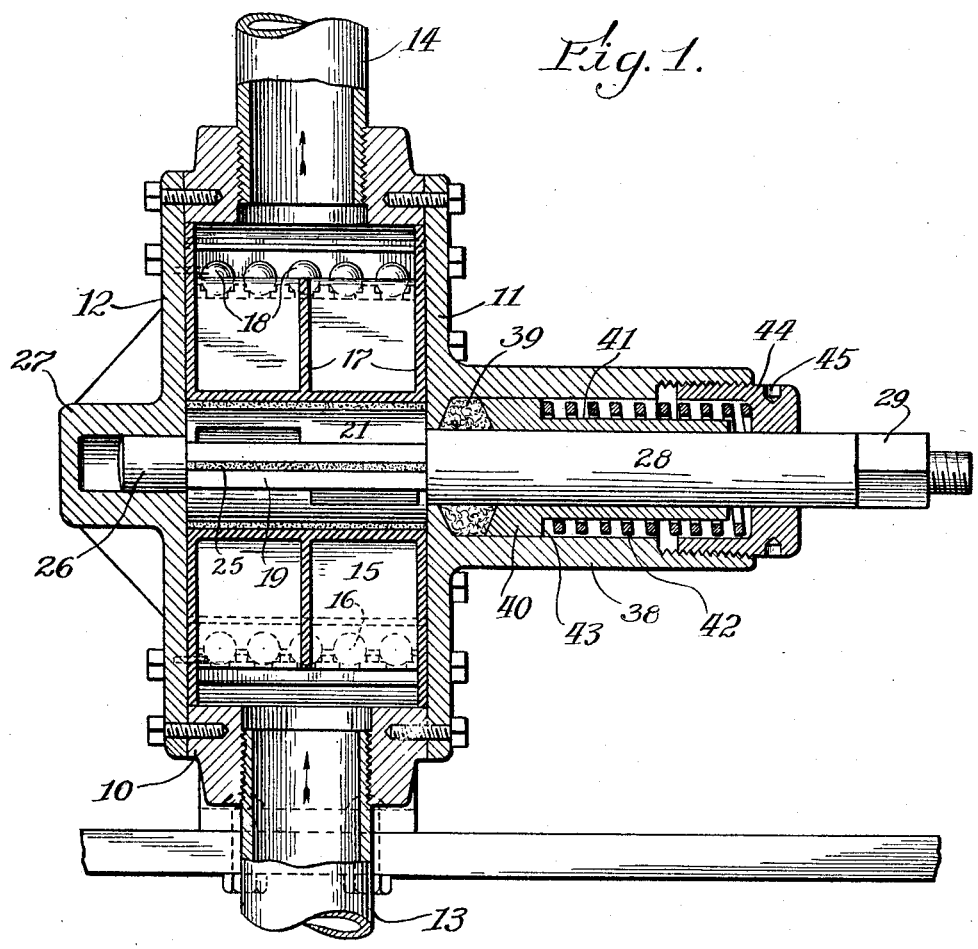
Fig. 1 is a vertical section of a pump having an oscillating piston.
Figure 2:
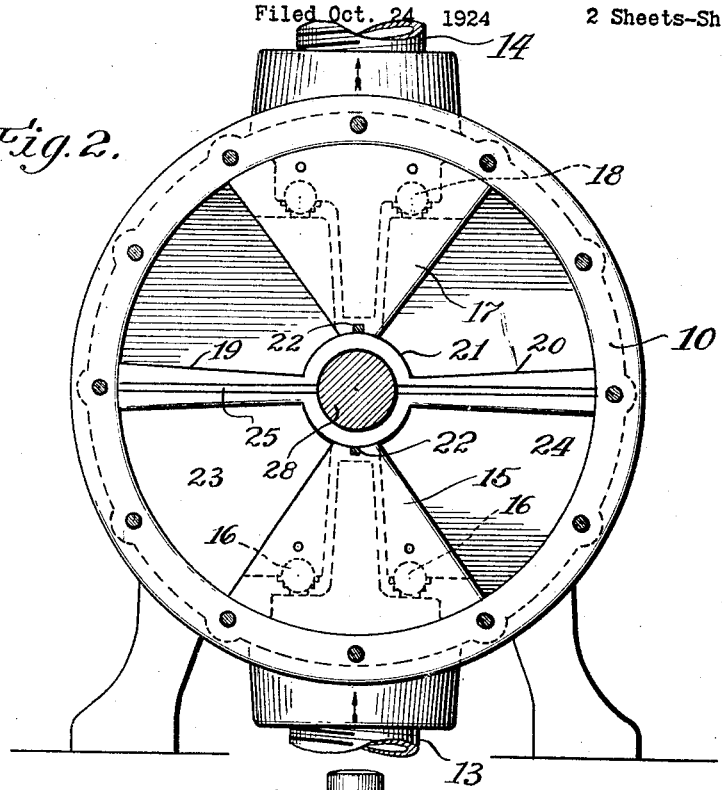
Fig. 2 is a front elevation with the front cover plate removed.

The pump body 10 is a cylindrical casing having a front cover 11 and a rear cover 12. The casing is also provided with an inlet pipe 13 and a discharge pipe 14. Inside of the casing is a triangular block 15 which serves as a cage for inlet valves 16, and another triangular block 17 which serves as a cage for the outlet valves 18. These cages 15 and 17 are secured in any convenient manner to the lower and upper parts of the casing as shown in Fig. 2.

The piston consists of two wings 19 and 20 which are integral with a central cylindrical portion 21. The apexes of the cages 15 and 17 are cut off (bored) to fit the cylindrical portion 21, and have therein packings 22 to make liquid tight joints between the chambers 23 and 24 in the pump casing.

The outer edges of the wings 19 and 20 fit the inner cylindrical wall of the casing, and the front and rear edges of these wings fit the inner faces of the covers 11 and 12. In these edges of the piston is packing 25 so that the wing 19 will divide the chamber 23 into two parts which have no communication with each other. In the same way, wing 20 divides chamber 24 into two parts which have no communication with each other.

At the rear center, the piston has a trunnion 26 which has a bearing in a boss 27 on cover 12. At the front center, the piston has a piston rod 28 which has a bearing in the stuffing box to be explained hereinafter. Power is applied at 29 on rod 28 to vibrate the wings 19 and 20 back and forth between the adjacent faces of cages 15 and 17.

Figure 3:
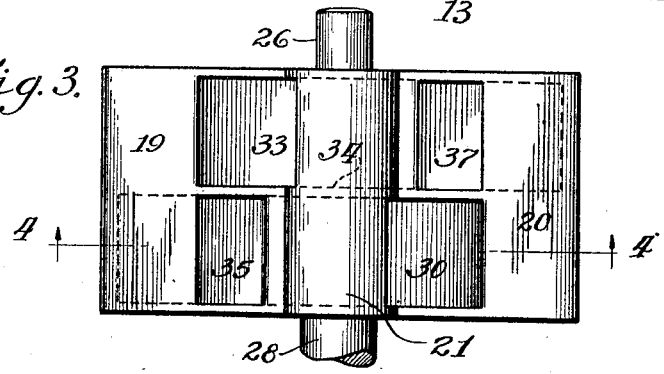
Fig. 3 is a plan of the piston.
Figure 4:
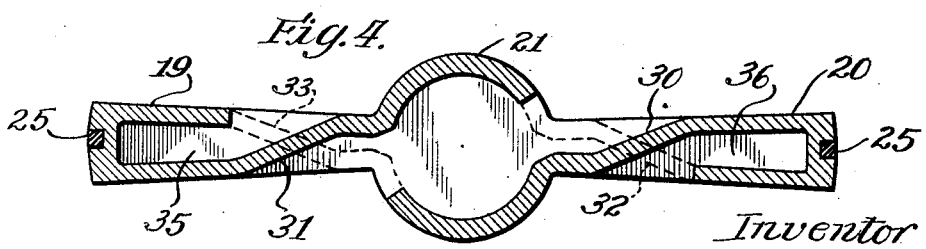
Fig. 4 is an enlarged section on line 4—4 of Fig. 3.

In the front half of the upper face of wing 20 is a recess 30, and in the front half of the lower face of wing 19 is a recess 31. These recesses 30 and 31 are in communication with each other thru the interior of part 21, as shown in Fig. 4. The rear half of the lower face of wing 20 has a recess 32, and the rear half of the upper face of wing 19 has a recess 33. The recesses 32 and 33 are in communication with each other thru the interior of the rear part of 21. The recesses 30 and 31 are separated from the recesses 32 and 33 by the partition 34 shown in Fig. 3. As thus constructed, the lower part of chamber 23 is in free communication with the upper part of chamber 24 and the lower part of chamber 24 is in free communication with the upper part of chamber 23.

When the piston is vibrated so that the wing 19 moves downward and the wing 20 moves upward, the liquid in chamber 23 under wing 19 will be forced thru the recesses 31 and 30 into chamber 24 over wing 20, and thence past the valves 18 to the discharge pipe 14. At the same time, the enlargement of the spaces under wing 20 and over wing 19 will draw liquid upward past valves 16 to fill these enlarged spaces. When the piston movement is reversed, liquid will flow upward thru recesses 32 and 33, and then out thru discharge 14.

The valves here shown are balls 16 and 18 which rest on countersunk seats. Any form of check valves may be used, but balls are convenient. There are here shown five inlet and five discharge valves for each chamber, or a total of twenty valves in all. In pumping liquids it is usually desirable to have a number of small valves rather than one large valve, but the matter here involved does not depend upon the number of valves, the size of valves, or the kind of valves.

Valves are supposed to be tight, but as a matter of fact all valves leak more or less at some time or other. If, after the pump has been in use for a while, it should stand for a day, more or less, without being used, and the valves should leak slightly, the liquid in chambers 23 and 24 would run down and out past the valves 16. This would leave the interior of the pump dry. Under such conditions the pump will not operate satisfactorily until after it has been primed.

In the front half of the wing 19 over recess 31 I provide a pocket 35, and back of recess 30 I provide a pocket 36. Over recess 32 I provide a pocket 37, and back of recess 33 I provide another pocket exactly like pocket 36. When the pump is operating, these pockets are all full of liquid.

If the pump stops with the piston in the position shown in Fig. 2, and the liquid in chambers 23 and 24 should leak out past the packing 25 and past the valves 16, a quantity of liquid would still remain in the pockets 35 and 37 in the upper face of the piston. Upon starting the pump under such conditions, the vibrations of the piston will cause the liquid in these pockets to flow over the surface of the wings 19 and 20 and serve to prime the pump by wetting the packing 25. If the pump stops with the wing 20 depressed and wing 19 elevated, then liquid will be retained in pockets 36 and 37, and when the pump is started, this liquid will flow out and serve to prime the pump. If the pump stops with wind 19 depressed, then the pockets in this wing will retain liquid which will be freed when the pump is started. There is no position in which the pump can stop without retaining liquid in two of its pockets.

The front plate 11 has a boss 38 which is bored out in the ordinary manner to receive the packing 39 and gland 40. The outer part of the gland is reduced in diameter as shown at 41, and between this reduced part and the interior of the boss is a spring 42 which bears against the shoulder 43 on gland 40. The interior of the outer end of the boss 38 is threaded, and in this is a nut 44 having holes 45 for a spanner wrench. By screwing the nut inward, the packing 39 is compressed by a pressure which corresponds to the compression force applied to spring 42 by nut 44. As the packing wears or becomes condensed, the spring 42 causes the gland 40 to automatically take up this wear and maintain the packing under continuous compressive force.

What I claim is:

1. In a pump having inlet and outlet valves, a piston provided with a pocket in which liquid is retained for priming purposes in case the liquid in the pump chamber should leak away when the pump is not running, said pocket being so arranged that the liquid retained in it will be discharged therefrom when the pump is started.

2. In a pump, a piston having pockets in opposite sides thereof, in which pockets liquid is retained when the pump stops and the other liquid in the pump chamber flows away, said pockets being so arranged that the retained liquid will be discharged into the pump chamber when the pump is started.

3. In a pump, a piston in the form of a plate arranged to vibrate on a central pivot to pump a liquid, said plate having pockets in its faces, in one or more of which pockets liquid is retained when the pump stops and other liquid drains away from the pump chamber, said parts being so arranged that the retained liquid will be discharged from the pockets into the pump chamber when the pump is started.

BERTRAM P. BATES.